(12) United States Patent
Ward, Jr.

(10) Patent No.: US 7,905,697 B2
(45) Date of Patent: Mar. 15, 2011

(54) WHEEL LOCKS WITH ROTATABLE SLEEVES AND METHODS OF MANUFACTURING WHEEL LOCKS

(76) Inventor: Barry Eugene Ward, Jr., Blue Island, IL (US)

( * ) Notice: Subject to any disclaimer, the term of this patent is extended or adjusted under 35 U.S.C. 154(b) by 692 days.

(21) Appl. No.: 11/376,819

(22) Filed: Mar. 16, 2006

(65) Prior Publication Data
US 2006/0228191 A1    Oct. 12, 2006

Related U.S. Application Data

(60) Provisional application No. 60/662,300, filed on Mar. 17, 2005.

(51) Int. Cl.
*F16B 37/14* (2006.01)
*F16B 37/08* (2006.01)
(52) U.S. Cl. .......... 411/429; 411/432; 411/910; 411/373
(58) Field of Classification Search .................. 411/429, 411/432, 373, 910
See application file for complete search history.

(56) References Cited

U.S. PATENT DOCUMENTS

| | | | | |
|---|---|---|---|---|
| 529,683 | A | * | 11/1894 | Herman .................. 301/115 |
| 1,870,427 | A | * | 8/1932 | Stallings et al. ............. 70/231 |
| 1,937,848 | A | * | 12/1933 | Shinn ...................... 70/231 |
| 3,540,245 | A | * | 11/1970 | Pope ...................... 70/231 |
| 3,782,146 | A | * | 1/1974 | Franke ..................... 70/232 |
| 4,057,985 | A | * | 11/1977 | Stahl ...................... 70/231 |
| 4,103,524 | A | | 8/1978 | Mitchell |
| 4,136,541 | A | * | 1/1979 | Gramlich ................... 70/231 |
| D255,540 | S | | 6/1980 | Baylis |
| 4,304,110 | A | | 12/1981 | Fain |
| 4,336,698 | A | * | 6/1982 | Hurd ...................... 70/231 |
| 4,406,140 | A | * | 9/1983 | Wolter ..................... 70/231 |
| 4,710,082 | A | * | 12/1987 | Curtis ..................... 411/373 |
| 4,726,723 | A | * | 2/1988 | Bainbridge ................ 411/432 |
| 4,754,628 | A | | 7/1988 | Siegel |
| 4,869,633 | A | | 9/1989 | Hayashi |
| D316,026 | S | | 4/1991 | Fuller |
| 5,095,723 | A | | 3/1992 | Lin |
| 5,097,686 | A | * | 3/1992 | Plumer .................... 70/232 |
| D331,870 | S | | 12/1992 | Fuller |
| D348,824 | S | | 7/1994 | Hsu |
| D349,839 | S | | 8/1994 | Gilardelli |
| D349,840 | S | | 8/1994 | Fuller |

(Continued)

OTHER PUBLICATIONS

Advanstar Communications, Inc.; *Lug Nut Fastening (Sizzlin' Products)*; Motor Age, Feb. 2003, V122, I2; PS22(1). Cahners Publishing CO; *Confirming Lug Nut's Grip*; Construction Equipment, Apr. 2001 V103, I4, P16.
Mike Mavrigian; *Wheel Fasteners*; Modem Tire Dealer; Apr. 1994; V75, N4, PS14(3).

*Primary Examiner* — David Reese
(74) *Attorney, Agent, or Firm* — Foley & Lardner LLP

(57) ABSTRACT

A wheel lock includes a key engaging member and a rotatable sleeve. The key engaging member has a threaded opening for receiving a bolt and a key shaped end for mating with a key. The rotatable sleeve surrounds at least a portion of the key engaging member. The rotatable sleeve is attached to the key engaging member and is capable of rotating around the key engaging member. The wheel lock may further include a spring washer for attaching the rotatable sleeve to the key engaging member. The rotatable sleeve is capable of rotating around the key engaging member without causing the threaded opening of the key engaging member to rotate. The key engaging member is configured such that the key engaging member rotates when a shaped protrusion of the key is mated with the key shaped end of the key engaging member and the key is rotated.

11 Claims, 12 Drawing Sheets

U.S. PATENT DOCUMENTS

| | | |
|---|---|---|
| D350,472 S | 9/1994 | White |
| D362,172 S | 9/1995 | Lo |
| D369,738 S | 5/1996 | Hull, Jr. |
| D370,616 S | 6/1996 | Fard |
| 5,803,690 A * | 9/1998 | Savinsky ............... 411/432 |
| 5,918,946 A | 7/1999 | Dimarco |
| D412,826 S | 8/1999 | Calpito |
| D422,205 S | 4/2000 | Hussaini |
| D422,898 S | 4/2000 | Hussaini |
| D432,006 S | 10/2000 | Hussaini |
| D446,111 S | 8/2001 | Hussaini |

\* cited by examiner

WHEEL LOCKS WITH ROTATABLE SLEEVES AND METHODS OF MANUFACTURING WHEEL LOCKS

CROSS-REFERENCE TO RELATED PATENT APPLICATIONS

Embodiments of the present invention relate to U.S. Provisional Application Ser. No. 60/662,300, filed Mar. 17, 2005, the contents of which are incorporated by reference herein and which is a basis for a claim of priority.

BACKGROUND OF THE INVENTION

1. Field of the Invention

Embodiments of the present invention relate generally to wheel locks and methods of manufacturing wheel locks and, in specific embodiments, to a wheel lock comprising a key engaging member having a threaded opening for receiving a bolt and a key shaped end for mating with a key, and a rotatable sleeve surrounding at least a portion of the key engaging member, where the rotatable sleeve is attached to the key engaging member and is capable of rotating around the key engaging member.

2. Related Art

As a way of protecting against the theft of a wheel from a movable object, such as an automobile, a trailer, a cart, or the like, it has become increasingly common to use a wheel lock instead of a standard lug nut on at least one bolt for securing the wheel to the moveable object. A wheel lock is typically designed with a smooth and rounded outer surface that is difficult to grip if attempting to loosen the wheel lock using the outer surface, and is typically designed as a continuous structure with a key shaped protrusion for receiving a specially shaped key that allows for facilitating a loosening of the wheel lock from a bolt. However, there have been problems with such wheel locks in that methods have been devised for loosening the wheel locks even without the corresponding specially shaped keys.

FIG. 1 illustrates a configuration of a traditional wheel lock 1 comprising an outer surface 2, an inner surface 3, a first end surface 4, a second end surface 5, a threaded opening 6, and a key engaging shaped protrusion 7. The outer surface 2 is typically round and smooth, so as to make it difficult to grip the outer surface 2 to loosen the wheel lock 1 from a bolt (not shown). The first end surface 4 is located at a first end of the outer surface 2. The second end surface 5 is typically recessed inward from a second end of the outer surface 2, and a recessed area is defined by the inner surface 3, where the inner surface 3 is opposite the outer surface 2 in the recessed area. The threaded opening 6 extends from the first end surface 4 toward the second end surface 5, and the threaded opening 6 is configured with threads to receive a bolt.

The second end surface 5 is located within the recessed area bounded by the inner surface 3, and the second end surface 5 is formed as a continuous single unit with the inner surface 3. The key engaging shaped protrusion 7 extends from the second end surface 5, and the key engaging shaped protrusion 7 has a shape that is configured to mate with a corresponding protrusion on a specially shaped key (not shown), such that the wheel lock 1 may be rotated when the key is engaged with the key engaging shaped protrusion 7 and the key is rotated. Because the second end surface 5 is formed as a continuous single unit with the inner surface 3 and, thus, is connected to the outer surface 2, the outer surface 2 rotates when the key engaging shaped protrusion 7 is rotated, and the key engaging shaped protrusion 7 rotates when the outer surface 2 is rotated.

It is important to note that the threaded opening 6 extends from the first end surface 4, which is formed as a single unit with the outer surface 2, so the threaded opening 6 rotates when the outer surface 2 is rotated. Moreover, the wheel lock 1 is formed of a continuous solid material from the outer surface 2 to an outer diameter of the threaded opening 6, so the threaded opening 6 must rotate when the outer surface 2 is rotated about an axis that is perpendicular to the first end surface 4.

The key engaging shaped protrusion 7 is designed to have a shape that is different from commonly shaped sockets, so that a common socket and a wrench cannot be used in a regular manner to easily loosen the wheel lock 1 from a bolt. Also, the outer surface 2 is rounded and smooth, so as to make it difficult to grip and rotate the outer surface 2 to loosen the wheel lock 1 from a bolt. The designed and contemplated way to loosen the wheel lock 1 from a bolt is to mate a specially designed key with the key engaging shaped protrusion 7, and then to rotate the key so as to rotate the key engaging shaped protrusion 7 and, as a consequence, rotate the threaded opening 6.

However, methods have been developed to loosen the wheel lock 1 from a bolt even without the corresponding specially designed key, so the security provided by the wheel lock 1 against the theft of a wheel has been greatly diminished. Such methods for loosening the wheel lock 1 from a bolt without the corresponding specially designed key will now be described in detail.

One well publicized method for loosening wheel locks such as the wheel lock 1 without the corresponding key includes obtaining a socket with an opening that is slightly smaller than a diameter of the wheel lock 1, and pounding the socket over at least an end portion of the outer surface 2 of the wheel lock 1 using a hammer, a mallet, or the like. Then, once the socket is securely attached to the outer surface 2 of the wheel lock 1, an impact gun, a ratchet, a breaker bar, or the like may be attached to the socket and used to rotate the socket, so as to rotate the outer surface 2 and, as a consequence, rotate the threaded opening 6. By rotating the threaded opening 6, the wheel lock 1 can be loosened from a bolt that is screwed into the threaded opening 6.

Another method for loosening wheel locks such as the wheel lock 1 without the corresponding key involves obtaining a standard nut with an opening size that is about a size of a diameter of the wheel lock 1 and welding or soldering the nut onto the outer surface 2 of the wheel lock 1. Then, once the nut is attached to the outer surface 2 of the wheel lock 1, an impact gun, a pipe wrench, a breaker bar, or the like may be used to rotate the nut, so as to rotate the outer surface 2 and, as a consequence, rotate the threaded opening 6. By rotating the threaded opening 6, the wheel lock 1 can be loosened from a bolt that is screwed into the threaded opening 6.

A yet further method for loosening wheel locks such as the wheel lock 1 without the corresponding key includes using a grinder, a hammer and chisel, or the like to grind or chip flat surfaces on an end of the outer surface 2. Then, once the flat surfaces have been created on the outer surface 2, a wrench, a breaker bar, a vice grips, a ratchet, an impact gun, or the like may be attached to the flat surfaces on the outer surface 2 and used to rotate the outer surface 2 and, as a consequence, rotate the threaded opening 6. By rotating the threaded opening 6, the wheel lock 1 can be loosened from a bolt that is screwed into the threaded opening 6.

In light of the various above-mentioned methods for loosening traditional wheel locks such as the wheel lock 1 without the corresponding specially shaped keys, there is a need for improved wheel locks that are less susceptible to being loosened without the corresponding keys. Also, there is a need for wheel locks that provide added security against wheels being stolen or improperly removed, and that are cost effective to manufacture.

SUMMARY OF THE DISCLOSURE

Embodiments of the present invention relate to a wheel lock with a rotatable sleeve. The rotatable sleeve surrounds at least a portion of a key engaging member and may rotate around the key engaging member without causing a threaded opening in the key engaging member to rotate. Such a wheel lock provides improved security over traditional wheel locks, because if a socket or nut is attached to the rotatable sleeve or a flat portion is grinded into the rotatable sleeve to allow for rotating the rotatable sleeve, the rotatable sleeve is capable of rotating without causing the threaded opening to rotate. As a consequence, even if the rotatable sleeve is rotated around the key engaging member, the wheel lock is not loosened from a bolt that is screwed into the threaded opening of the key engaging member.

A wheel lock in accordance with a general embodiment of the present invention comprises a key engaging member and a rotatable sleeve. The key engaging member has a threaded opening for receiving a bolt and a key shaped end for mating with a key. The rotatable sleeve surrounds at least a portion of the key engaging member. The rotatable sleeve is attached to the key engaging member and is capable of rotating around the key engaging member.

In various embodiments, the wheel lock further comprises a spring washer for attaching the rotatable sleeve to the key engaging member. In further embodiments, an outer surface of the key engaging member has an annular groove, an inner surface of the rotatable sleeve has a particular annular groove, and a first portion of the spring washer is located in the annular groove in the outer surface of the key engaging member and a second portion of the spring washer is located in the particular annular groove in the inner surface of the rotatable sleeve. In some embodiments, the spring washer is capable of being compressed, and the spring washer is capable of fitting entirely within the annular groove in the outer surface of the key engaging member when the spring washer is compressed.

In various embodiments, the wheel lock further comprises a spacer sleeve located between the key engaging member and the rotatable sleeve. In some embodiments, the key engaging member comprises a first portion with a first diameter and a second portion with a second diameter smaller than the first diameter, and the rotatable sleeve comprises a protrusion extending from an inner surface of the rotatable sleeve. In further embodiments, the spacer sleeve surrounds the second portion of the key engaging member, a first end of the spacer sleeve is in contact with a first end of the first portion of the key engaging member, and a second end of the spacer sleeve is in contact with the protrusion extending from the inner surface of the rotatable sleeve.

In some embodiments, the wheel lock further comprises the key, where the key comprises a shaped protrusion for mating with the key shaped end of the key engaging member, and one or more flat surfaces for receiving a socket to rotate the key. In further embodiments, the key engaging member is configured such that the key engaging member rotates when the shaped protrusion of the key is mated with the key shaped end of the key engaging member and the key is rotated.

In various embodiments, a portion of the rotatable sleeve surrounds at least a portion of the key shaped end of the key engaging member. Also, in various embodiments, the rotatable sleeve is capable of rotating around the key engaging member without causing the threaded opening of the key engaging member to rotate. In some embodiments, the rotatable sleeve is cylindrical with an opening from a first end of the rotatable sleeve to a second end of the rotatable sleeve. Also, in some embodiments, the threaded opening is at an opposite end of the key engaging member from the key shaped end.

A method of manufacturing a wheel lock in accordance with an embodiment of the present invention comprises providing a key engaging member having a threaded opening for receiving a bolt and a key shaped end for mating with a key, providing a rotatable sleeve having an inner surface surrounding an open space, inserting the key engaging member into the open space surrounded by the inner surface of the rotatable sleeve, and attaching the rotatable sleeve to the key engaging member in a manner that allows the rotatable sleeve to be capable of rotating around the key engaging member.

In various embodiments, attaching the rotatable sleeve to the key engaging member in a manner that allows the rotatable sleeve to be capable of rotating around the key engaging member, comprises providing a spring washer and compressing the spring washer into an annular groove in an outer surface of the key engaging member. In further embodiments, inserting the key engaging member into the open space surrounded by the inner surface of the rotatable sleeve, comprises causing the spring washer to expand by inserting the key engaging member into the open space surround by the inner surface of the rotatable sleeve such that a first portion of the spring washer expands into a particular annular groove in the inner surface of the rotatable sleeve. In yet further embodiments, a second portion of the spring washer remains in the annular groove in the outer surface of the key engaging member when the first portion of the spring washer expands into the particular annular groove in the inner surface of the rotatable sleeve.

In various embodiments, the method of manufacturing a wheel lock further comprises placing a spacer sleeve between at least a portion of the rotatable sleeve and at least a portion of the key engaging member. In some embodiments, the method of manufacturing a wheel lock further comprises providing the key, where the key has a shaped protrusion for mating with the key shaped end of the key engaging member. Also, in some embodiments, attaching the rotatable sleeve to the key engaging member in a manner that allows the rotatable sleeve to be capable of rotating around the key engaging member, comprises attaching the rotatable sleeve to the key engaging member in a manner that allows the rotatable sleeve to be capable of rotating around the key engaging member without causing the threaded opening of the key engaging member to rotate. In various embodiments, the threaded opening is at an opposite end of the key engaging member from the key shaped end.

Therefore, embodiments of the present invention provide for wheel locks with rotatable sleeves that allow for increased security against theft of wheels secured with the wheel locks as compared with traditional wheel locks. Also, embodiments of the present invention allow for manufacturing wheel locks with rotatable sleeves in a cost effective manner.

DETAILED DESCRIPTION OF PREFERRED EMBODIMENTS

Figure 1:
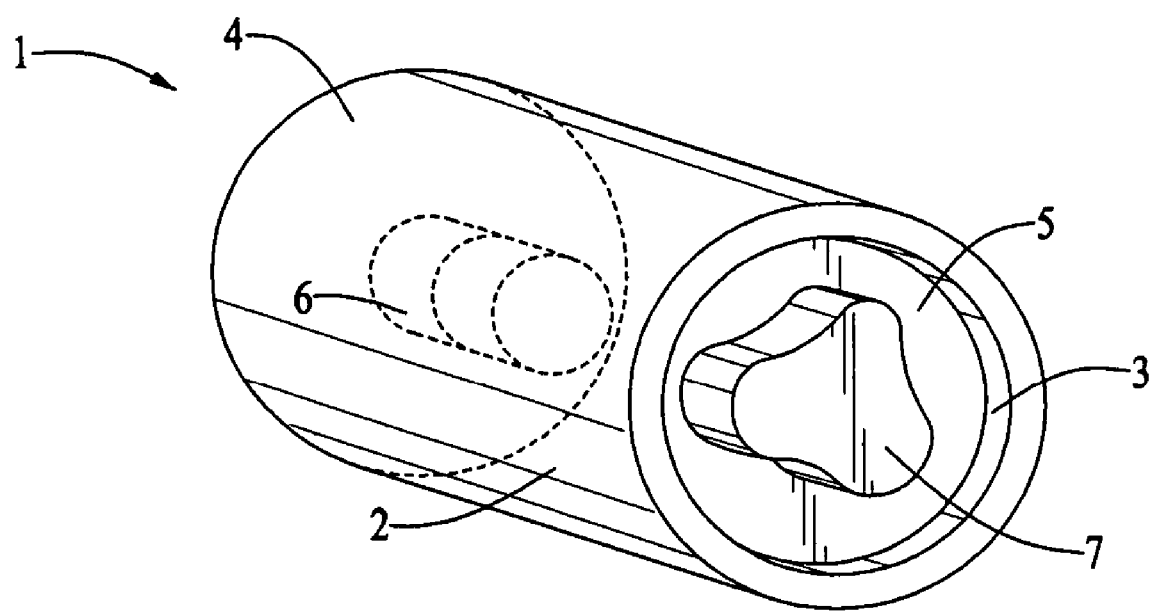
FIG. 1 illustrates a configuration of a traditional wheel lock.
Figure 2:
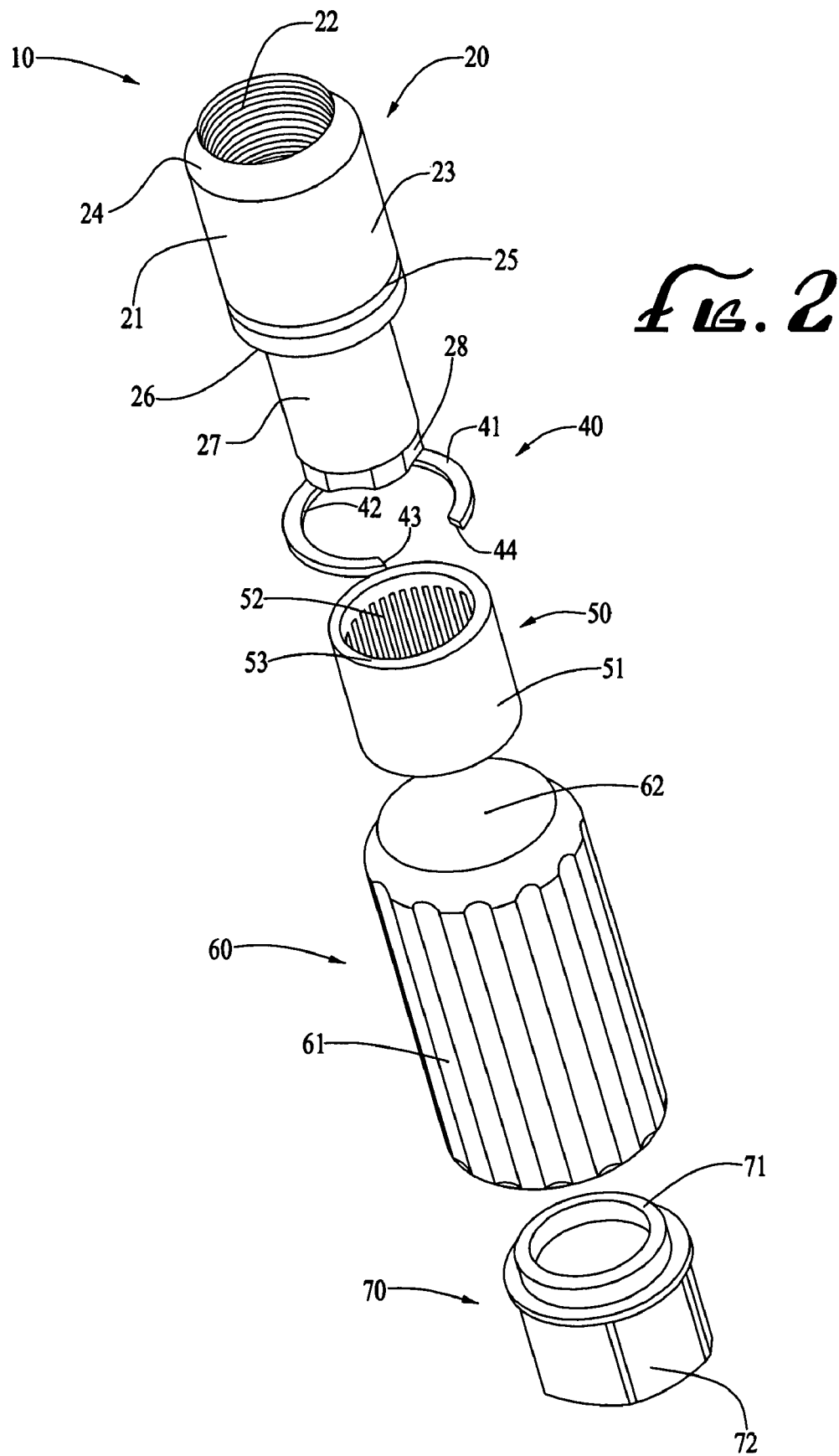
FIG. 2 illustrates an exploded view of a wheel lock in accordance with an embodiment of the present invention.

FIG. 2 illustrates an exploded view of a wheel lock 10 in accordance with an embodiment of the present invention. The wheel lock 10 comprises a key engaging member 20, a spring washer 40, a spacer sleeve 50, and a rotatable sleeve 60. In various embodiments, the wheel lock 10 further comprises a key 70.

The key engaging member 20 comprises an outer surface 21, a threaded opening 22, and a key shaped end 28. In some embodiments, the key engaging member 20 comprises a metal or the like. In various embodiments, the outer surface 21 comprises a first portion 23 with a first circumference and a second portion 27 with a second circumference that is smaller than the first circumference of the first portion 23. The first portion 23 comprises a first end 24 that is adjacent to the threaded opening 22, and a second end 26 opposite the first end 24.

The threaded opening 22 is threaded and allows for receiving a bolt (not shown) when the bolt is placed into the threaded opening 22 and the key engaging member 20 is rotated around the bolt. The key shaped end 28 of the key engaging member 20 is shaped for mating with a corresponding shaped protrusion 71 of the key 70, and the key engaging member 20 is configured such that the key engaging member 20 rotates when the shaped protrusion 71 of the key 70 is mated with the key shaped end 28 of the key engaging member 20 and the key 70 is rotated.

The spring washer 40 allows for attaching the key engaging member 20 to the rotatable sleeve 60. In some embodiments, the spring washer 40 comprises a metal or the like. In various embodiments, the spring washer 40 comprises a semi-ring shaped structure with an outer surface 41, an inner surface 42, a first end 43, and a second end 44. Also, in various embodiments, the spring washer 40 is capable of being compressed and is capable of fitting within an annular groove 25 in the outer surface 21 of the key engaging member 20 when the spring washer 40 is compressed. In some embodiments, the spring washer 40 is configured such that when the spring washer 40 is compressed, the spring washer 40 is biased toward expanding outward, such that the spring washer 40 expands outward when not constrained by an object.

The spacer sleeve 50 is shaped so as to be able to fit between the second portion 27 of the outer surface 21 of the key engaging member 20 and an inner surface 62 of the rotatable sleeve 60. In some embodiments, the spacer sleeve 50 comprises a metal or the like. In various embodiments, the spacer sleeve comprises a cylindrical structure with an opening, a ring-shaped structure, or the like, with an outer surface 51, an inner surface 52, and a first end 53. In some embodiments, a diameter of the inner surface 52 of the spacer sleeve 50 is greater than a diameter of the second portion 27 of the outer surface 21 of the key engaging member 20. Also, in some embodiments, a diameter of the outer surface 51 of the spacer sleeve 50 is smaller than a diameter of the inner surface 62 of the rotatable sleeve 60.

The rotatable sleeve 60 is shaped to be able to surround at least a portion of the key engaging member 20 when the key engaging member 20 is inserted into the rotatable sleeve 60. In various embodiments, the rotatable sleeve 60 is configured to be attachable to the key engaging member 20 and is configured to be capable of rotating around the key engaging member 20 when attached to the key engaging member 20. In some embodiments, the rotatable sleeve 60 comprises a metal or the like. In various embodiments, the rotatable sleeve 60 comprises a cylindrical structure with an opening from a first end of the rotatable sleeve 60 to a second end of the rotatable sleeve 60. The rotatable sleeve 60 comprises an outer surface 61 and the inner surface 62. In various embodiments, the inner surface 62 defines a space within the rotatable sleeve 60. Also, in various embodiments, the outer surface 61 of the rotatable sleeve 60 may comprise fluting or other indentations, or the outer surface 61 may be smooth.

The key 70 comprises the shaped protrusion 71 for mating with the key shaped end 28 of the key engaging member 20. In various embodiments, the key 70 further comprises one or more flat surfaces 72 for receiving a socket (not shown) to rotate the key 70. In some embodiments, the key 70 comprises a metal or the like. In various embodiments, the key shaped end 28 of the key engaging member 20 is shaped in a unique or special way such as to be difficult to grip with a standard socket to rotate the key engaging member 20. Also, in various embodiments, the shaped protrusion 71 of the key 70 is configured with an inner perimeter that matches an outer perimeter of the key shaped end 28 of the key engaging member 20 and that is slightly larger than the outer perimeter of the key shaped end 28 of the key engaging member 20, such that the shaped protrusion 71 can be mated with the key shaped end 28 of the key engaging member 20.

Figure 3:
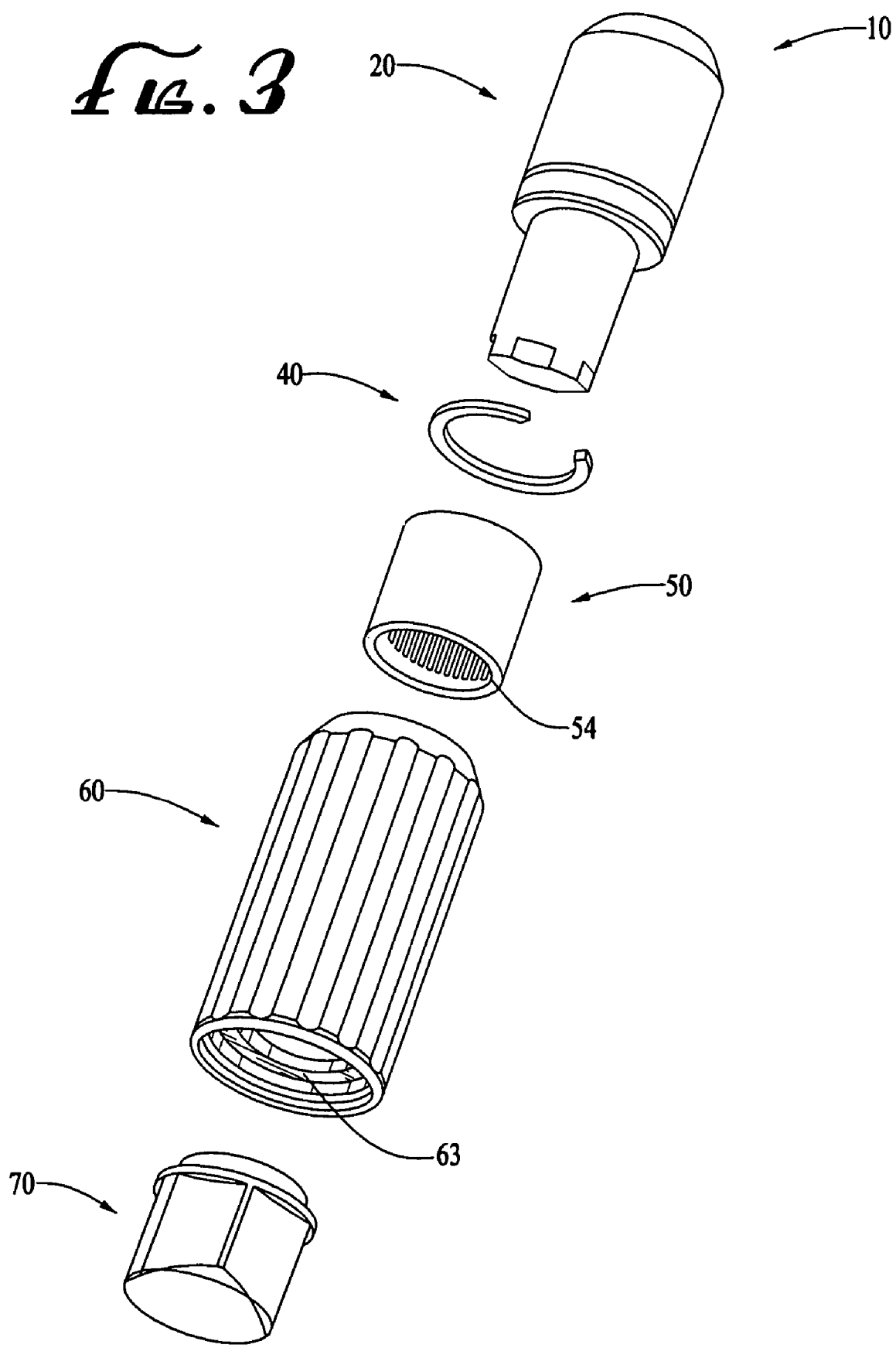
FIG. 3 illustrates an exploded view of a wheel lock from another angle in accordance with an embodiment of the present invention.

FIG. 3 illustrates an exploded view of the wheel lock 10 from another angle in accordance with an embodiment of the present invention. As illustrated in FIG. 3, the spacer sleeve 50 may comprise a second end 54. Also, as illustrated in FIG. 3 and with reference to FIG. 2, the rotatable sleeve 60 may comprise a protrusion 63 extending from the inner surface 62 of the rotatable sleeve 60. In various embodiments, the protrusion 63 of the rotatable sleeve 60 has a size so as to be able to hold the spacer member 50 within the rotatable sleeve 60, and the protrusion 63 defines an opening with a diameter that is larger than a diameter of the second portion 27 of the outer surface 21 of the key engaging member 20, such that at least a part of the second portion 27 of the outer surface 21 of the key engaging member 20 may be inserted through the protrusion 63.

Figure 4:
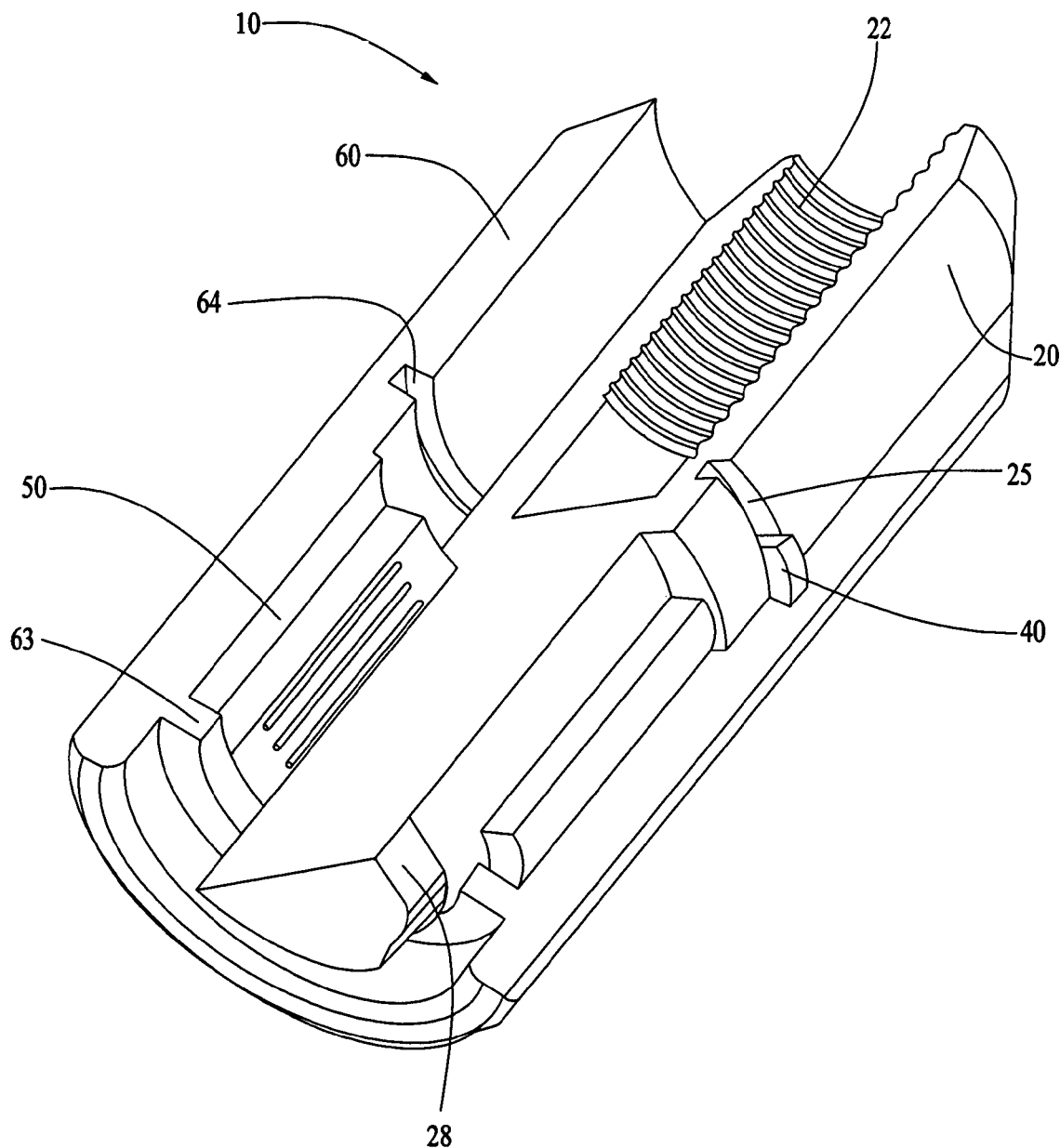
FIG. 4 illustrates a cross-sectional assembled view of a wheel lock in accordance with an embodiment of the present invention.

FIG. 4 illustrates a cross-sectional assembled view of the wheel lock 10 in accordance with an embodiment of the present invention. As illustrated in FIG. 4 and with reference to FIGS. 2 and 3, in various embodiments, the rotatable sleeve 60 further comprises an annular groove 64 that is shaped to receive at least a portion of the spring washer 40. The rotatable sleeve 60 surrounds at least a portion of the key engaging member 20. In various embodiments, the rotatable sleeve 60 is attached to the key engaging member 20 and is capable of rotating around the key engaging member 20. Also, in various embodiments, the rotatable sleeve 60 is capable of rotating around the key engaging member 20 without causing the threaded opening 22 of the key engaging member 20 to rotate.

In some embodiments, the spring washer 40 attaches the rotatable sleeve 60 to the key engaging member 20. In various embodiments, a first portion of the spring washer 40 is located in the annular groove 25 in the outer surface 21 of the key engaging member 20, and a second portion of the spring washer 40 is located in the annular groove 64 in the inner surface 62 of the rotatable sleeve 60. Also, in various embodiments, when the rotatable sleeve 60 is attached to the key engaging member 20 by the spring washer 40, the rotatable sleeve 60 is capable of rotating around the key engaging member 20 about an axis that passes from the threaded opening 22 of the key engaging member 20 to the key shaped end 28 of the key engaging member 20. Thus, in various embodiments, the rotatable sleeve 60 is rotatable with respect to the key engaging member 20.

In some embodiments, the spacer sleeve 50 is located between at least a portion of the key engaging member 20 and at least a portion of the rotatable sleeve 60. Also, in some embodiments, the spacer sleeve 50 surrounds the second portion 27 of the outer surface 21 of the key engaging member 20. In various embodiments, the first end 53 of the spacer sleeve 50 is in contact with the second end 26 of the first portion 23 of the key engaging member 20. Also, in various embodiments, the second end 54 of the spacer sleeve 50 is in contact with the protrusion 63 extending from the inner surface 62 of the rotatable sleeve 60.

In some embodiments, at least a part of the second portion 27 of the outer surface 21 of the key engaging member 20 extends through an area surrounded by the protrusion 63 that extends from the inner surface 62 of the rotatable sleeve 60. In various embodiments, at least a portion of the rotatable sleeve 60 surrounds at least a portion of the key shaped end 28 of the key engaging member 20. Also, in various embodiments, the key shaped end 28 of the key engaging member 20 is at least partially exposed at an end of the rotatable sleeve 60 such that the key 70 may be mated with the key shaped end 28 to rotate the key engaging member 20.

The wheel lock 10 has many advantages over the traditional wheel locks. By providing the rotatable sleeve 60 around the key engaging member 20, where the rotatable sleeve 60 is capable of rotating around the key engaging member 20, the rotatable sleeve 60 may, for example, be rotated without causing the threaded opening 22 to be loosened or unscrewed from a bolt (not shown). As a consequence, for example, even if a socket is jammed onto the rotatable sleeve 60 or a nut is welded onto the rotatable sleeve 60 or a grinder is used to grind a flat surface on the rotatable sleeve 60 so as to provide a grip to rotate the rotatable sleeve 60, the rotatable sleeve 60 may rotate without causing the wheel lock 10 to be loosened or unscrewed from a bolt. Thus, the wheel lock 10 provides added security against the theft of wheels secured with the wheel lock 10 as compared to the traditional wheel locks.

Figure 5:
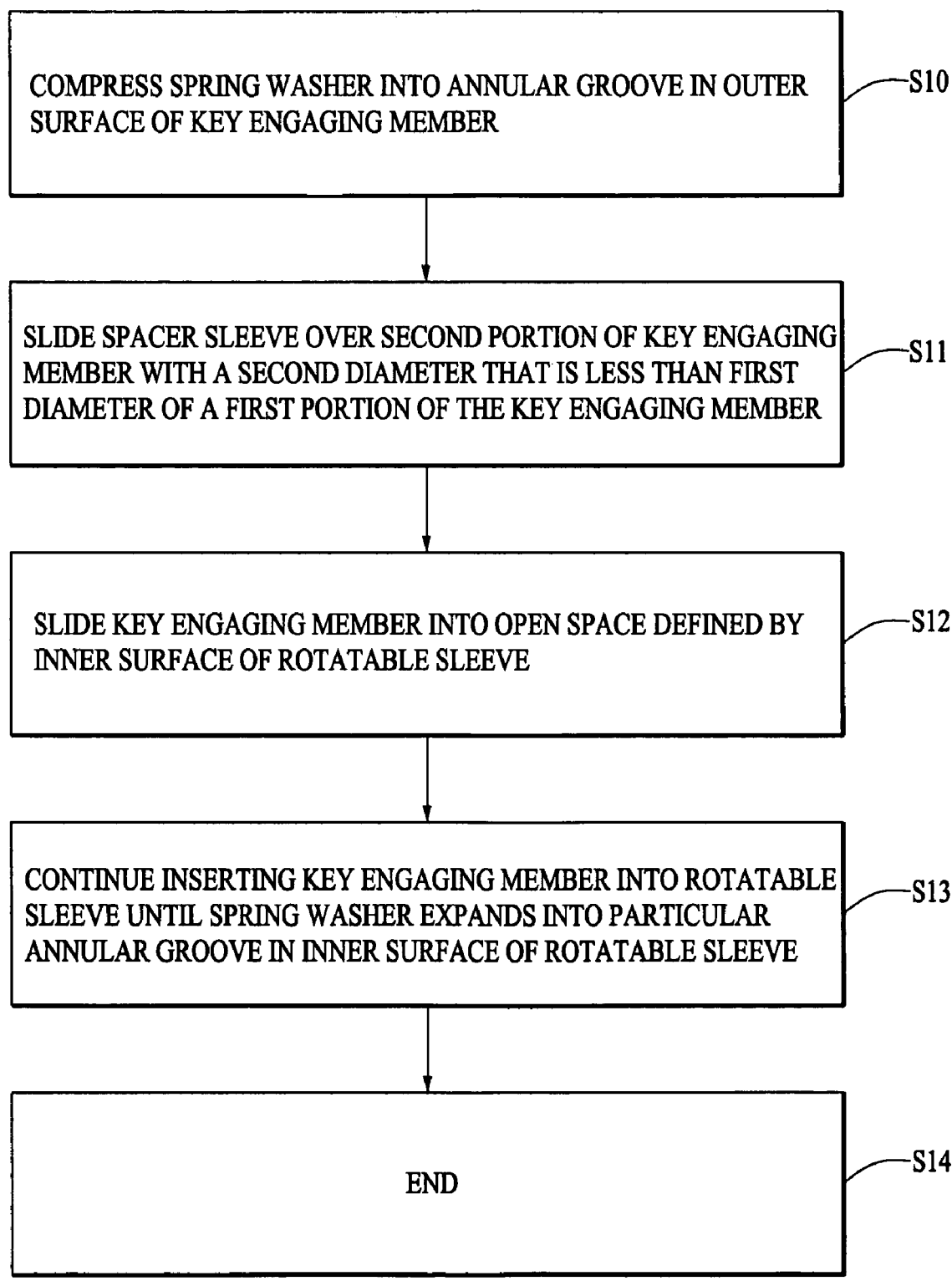
FIG. 5 illustrates a method of manufacturing a wheel lock in accordance with an embodiment of the present invention.

FIG. 5 illustrates a method of manufacturing the wheel lock 10 in accordance with an embodiment of the present invention. The key engaging member 20 is provided, where the key engaging member 20 has the threaded opening 22 for receiving a bolt and the key shaped end 28 for mating with the key 70. The rotatable sleeve 60 is provided with the inner surface 62 surrounding an open space. The spring washer 40 is also provided.

In S10, the spring washer 40 is compressed into the annular groove 25 in the outer surface 21 of the key engaging member 20, and the method continues to S11. In S11, the spacer sleeve 50 is slid or placed over the second portion 27 of the outer surface 21 of the key engaging member 20, where the second portion 27 may have a second diameter that is less than a first diameter of the first portion 23 of the outer surface 21 of the key engaging member 20. The method then continues to S12.

In S12, the key engaging member 20 is slid or inserted into the open space defined by the inner surface 62 of the rotatable sleeve 60, and the method continues to S13. In S13, the key engaging member 20 is continued to be slid or inserted into the rotatable sleeve 60 until the spring washer 40 expands at least partially into the annular groove 64 in the inner surface 62 of the rotatable sleeve 60. The method then ends in S14.

In accordance with the method of manufacturing illustrated in FIG. 5, the rotatable sleeve 60 may be attached to the key engaging member 20 in a manner that allows the rotatable sleeve 60 to be capable of rotating around the key engaging member 20 after the rotatable sleeve 60 is attached to the key engaging member 20. In various embodiments, the spring washer 40 is caused to expand by inserting the key engaging member 20 into the open space surrounded by the inner surface 62 of the rotatable sleeve 60 such that a first portion of the spring washer 40 expands into the annular groove 64 in the inner surface 62 of the rotatable sleeve 60. In further embodiments, a second portion of the spring washer 40 remains in the annular groove 25 in the outer surface 21 of the key engaging member 20 after the first portion of the spring washer 40 expands into the annular groove 64 in the inner surface 62 of the rotatable sleeve 60.

In various embodiments, the method of manufacturing the wheel lock 10 further comprises providing the key 70, where the key 70 has the shaped protrusion 71 for mating with the key shaped end 28 of the key engaging member 20. Also, in various embodiments, the method of manufacturing the wheel lock 10 comprises attaching the rotatable sleeve 60 to the key engaging member 20 in a manner that allows the rotatable sleeve 60 to be capable of rotating around the key engaging member 20 without causing the threaded opening 22 of the key engaging member 20 to rotate. In some embodiments, the threaded opening 22 is at an opposite end of the key engaging member 20 from the key shaped end 28.

Figure 6:
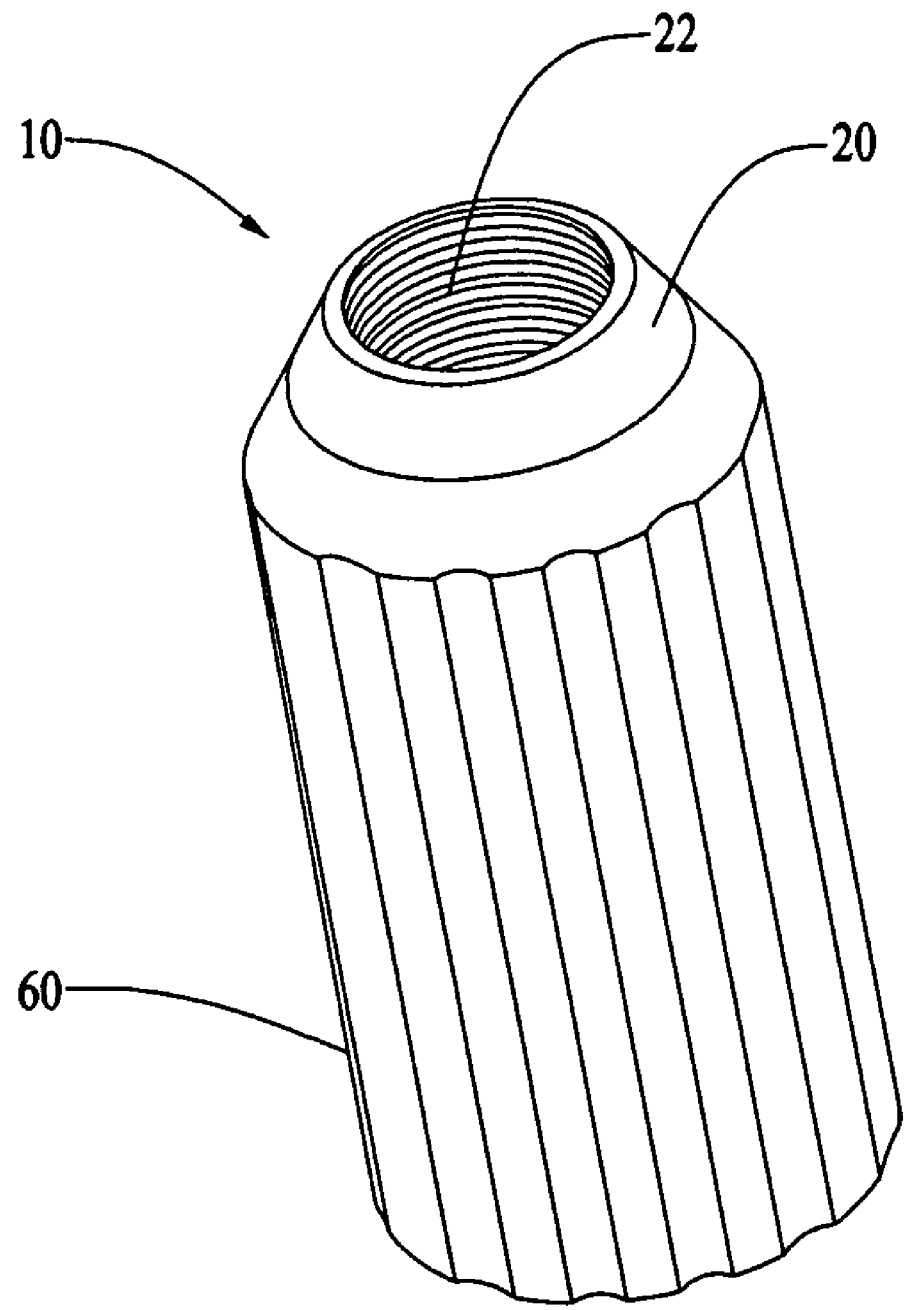
FIG. 6 illustrates an external assembled view of a wheel lock in accordance with an embodiment of the present invention.
Figure 7:
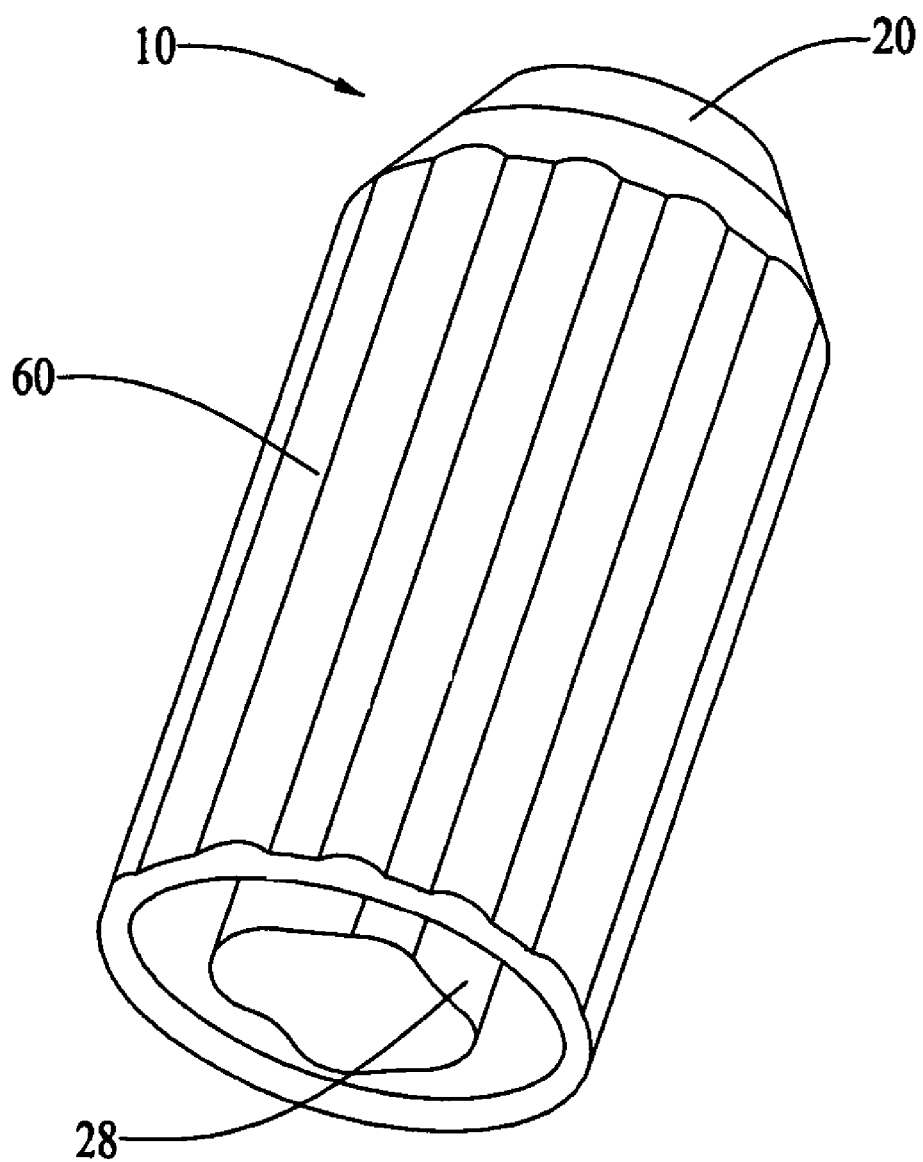
FIG. 7 illustrates an external assembled view of a wheel lock from another angle in accordance with an embodiment of the present invention.

FIG. 6 illustrates an external assembled view of the wheel lock 10 in accordance with an embodiment of the present invention. At least a portion of the key engaging member 20 is surrounded by the rotatable sleeve 60. Also, the threaded opening 22 of the key engaging member 20 is exposed at an end of the rotatable sleeve 60. FIG. 7 illustrates an external assembled view of the wheel lock 10 from another angle in accordance with an embodiment of the present invention. In various embodiments, at least a portion of the key shaped end 28 of the key engaging member 20 is surrounded by the rotatable sleeve 60, while the key shaped end 28 is exposed at a particular end of the rotatable sleeve 60.

Figure 8:
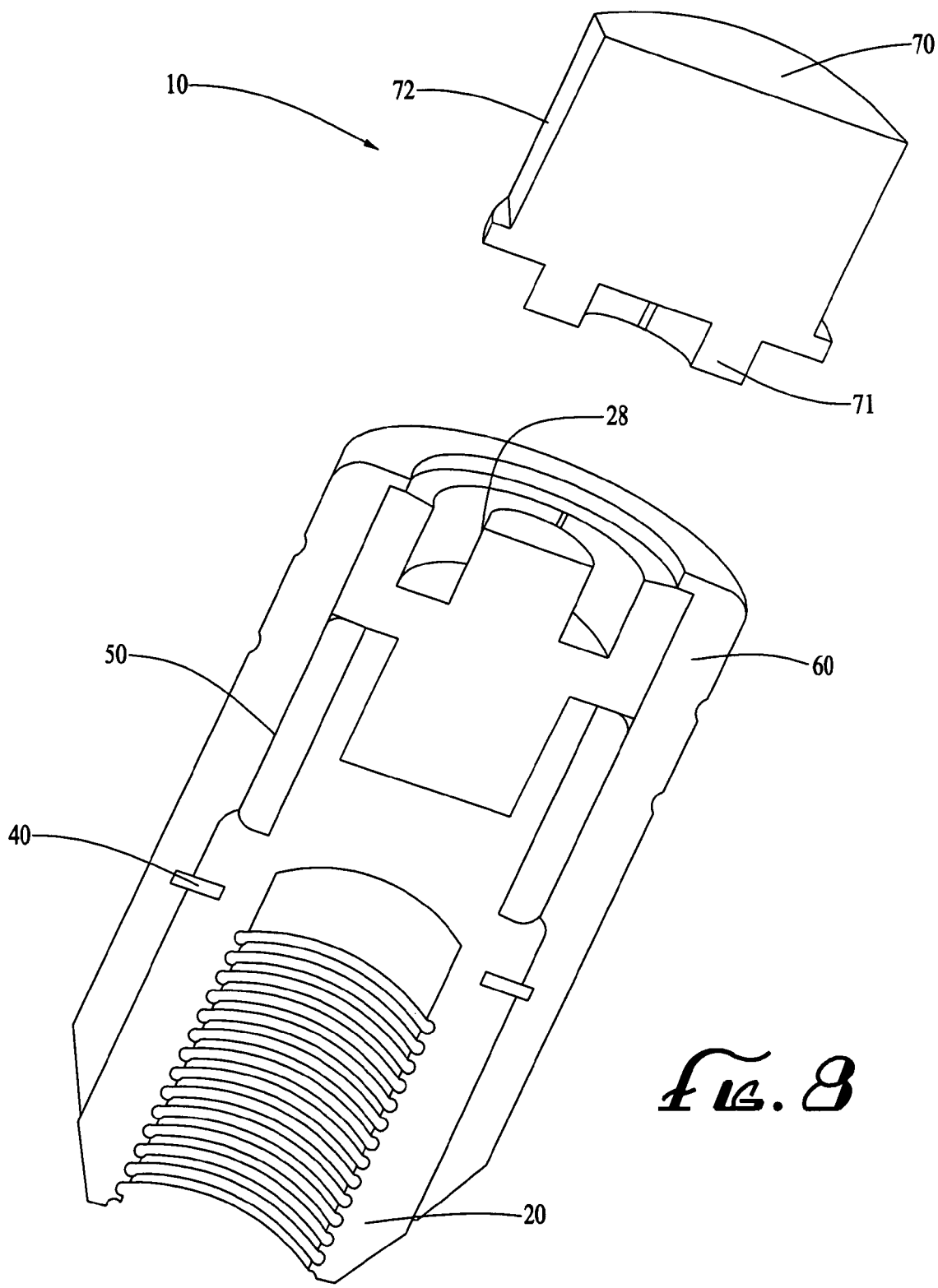
FIG. 8 illustrates a cross-sectional assembled view of a wheel lock with a key in accordance with an embodiment of the present invention.

FIG. 8 illustrates a cross-sectional assembled view of the wheel lock 10 with the key 70 in accordance with an embodiment of the present invention. The shaped protrusion 71 of the key 70 is configured to mate with the key shaped end 28 of the key engaging member 20. The key 70 may be mated with the key shaped end 28 of the key engaging member 20 when it is desired to rotate the key engaging member 20 so as to tighten or loosen the key engaging member 20 to or from a bolt (not shown). Once the key 70 has been used to rotate the key engaging member 20 to the desired position, the key 70 may be detached from the key shaped end 28 of the key engaging member 20 and stored until later needed for rotating the key engaging member 20.

In various embodiments, the key 70 comprises the one or more flat surfaces 72 that may be used in conjunction with a socket to rotate the key 70 with an impact gun, a ratchet, a wrench, a breaker bar, or the like, or may be used without a socket to rotate the key 70 using a wrench, a breaker bar, vice grips, or the like. Also, in various embodiments, the key shaped end 28 of the key engaging member 20 may comprise a non-uniform shape with various rounded edges, such that the key shaped end 28 would be difficult to grip with standard sockets. As a consequence, the wheel lock 10 may be designed to work with the key 70, where the key 70 is unique or special, so as to provide an added level of security against the wheel lock 10 being loosened from a bolt using a standard socket without the key 70.

Figure 9:
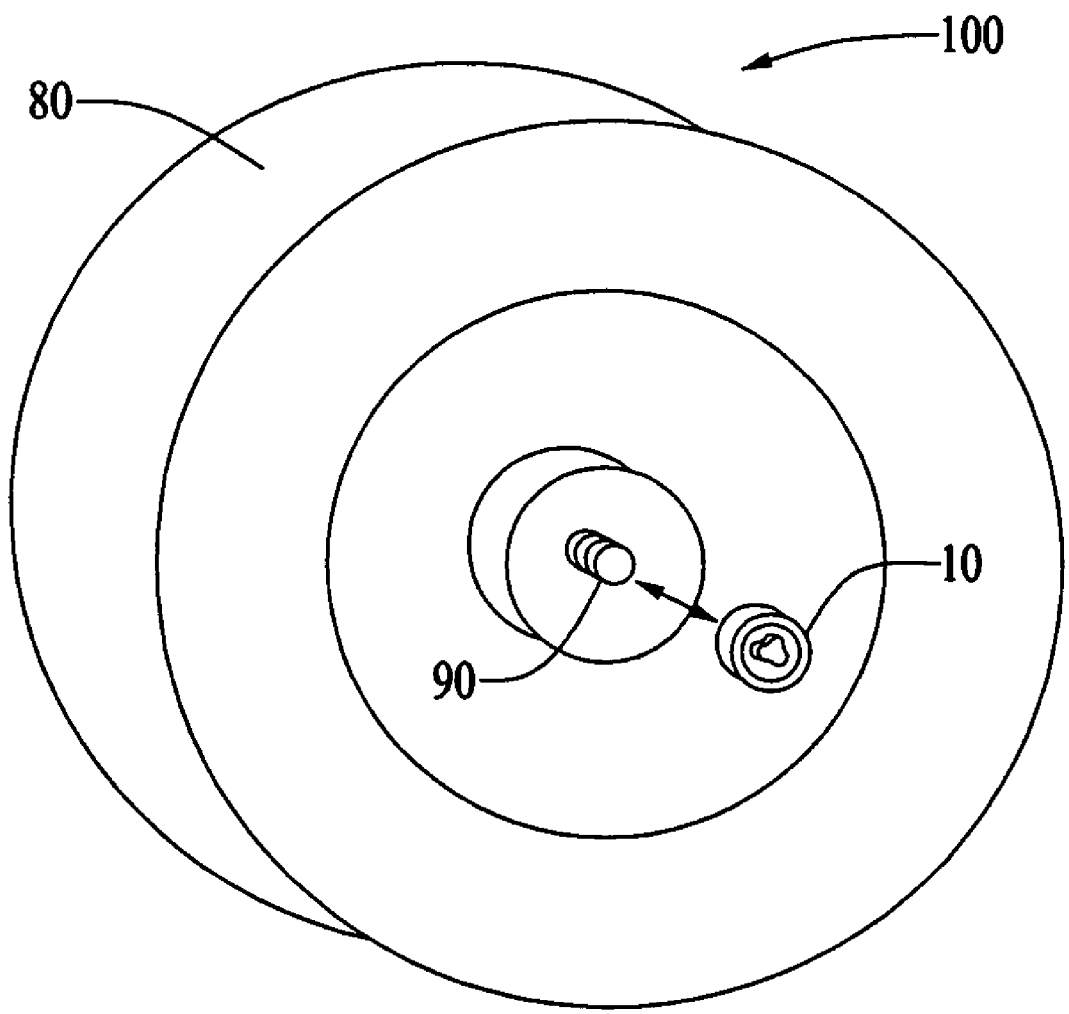
FIG. 9 illustrates a system in accordance with an embodiment of the present invention.

FIG. 9 illustrates a system 100 in accordance with an embodiment of the present invention comprising a wheel 80, a bolt 90, and the wheel lock 10. The bolt 90 may be inserted through the wheel 80, and then the wheel lock 10 may be screwed onto and tightened to the bolt 90. The bolt 90 may have threads to mate with the threads of the threaded opening 22 (refer to FIG. 4) of the key engaging member 20, such that the bolt 90 may be received into the threaded opening 22.

Figure 10:
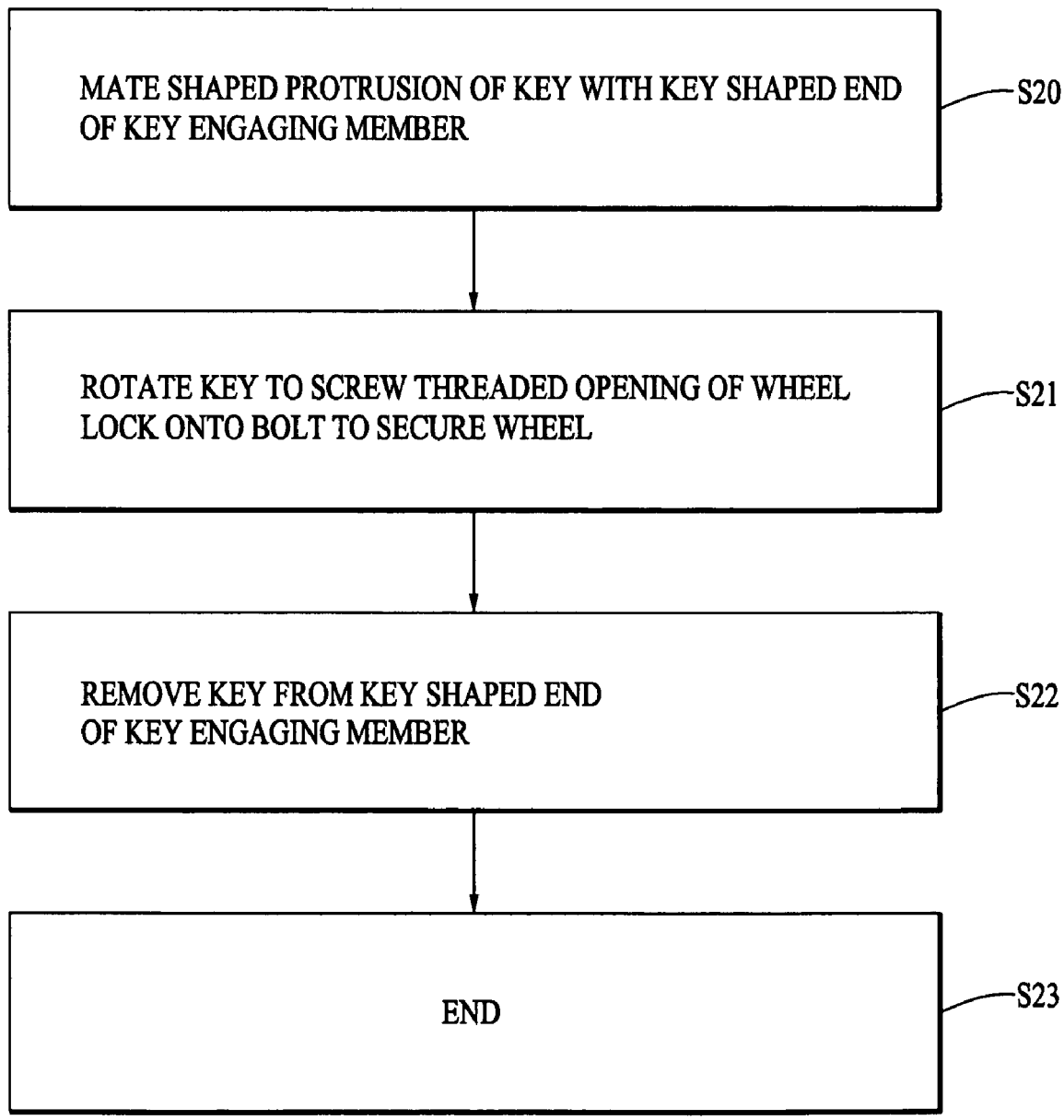
FIG. 10 illustrates a flowchart of a method for using a wheel lock in accordance with an embodiment of the present invention.

FIG. 10 illustrates a flowchart of a method for using the wheel lock 10 in accordance with an embodiment of the present invention. The threaded opening 22 of the wheel lock 10 is placed adjacent to an end of the bolt 90. In S20, the shaped protrusion 71 of the key 70 is mated with the key shaped end 28 of the key engaging member 20, and the method continues to S21. In S21, the key 70 is rotated by, for example, an impact gun, a wrench, a breaker bar, or the like to screw the threaded opening 22 of the wheel lock 10 onto the bolt 90 to secure the wheel 80. The method then continues to S22. In S22, the key 70 is removed or detached from the key shaped end 28 of the key engaging member 20, and the method then ends in S23.

Figure 11:
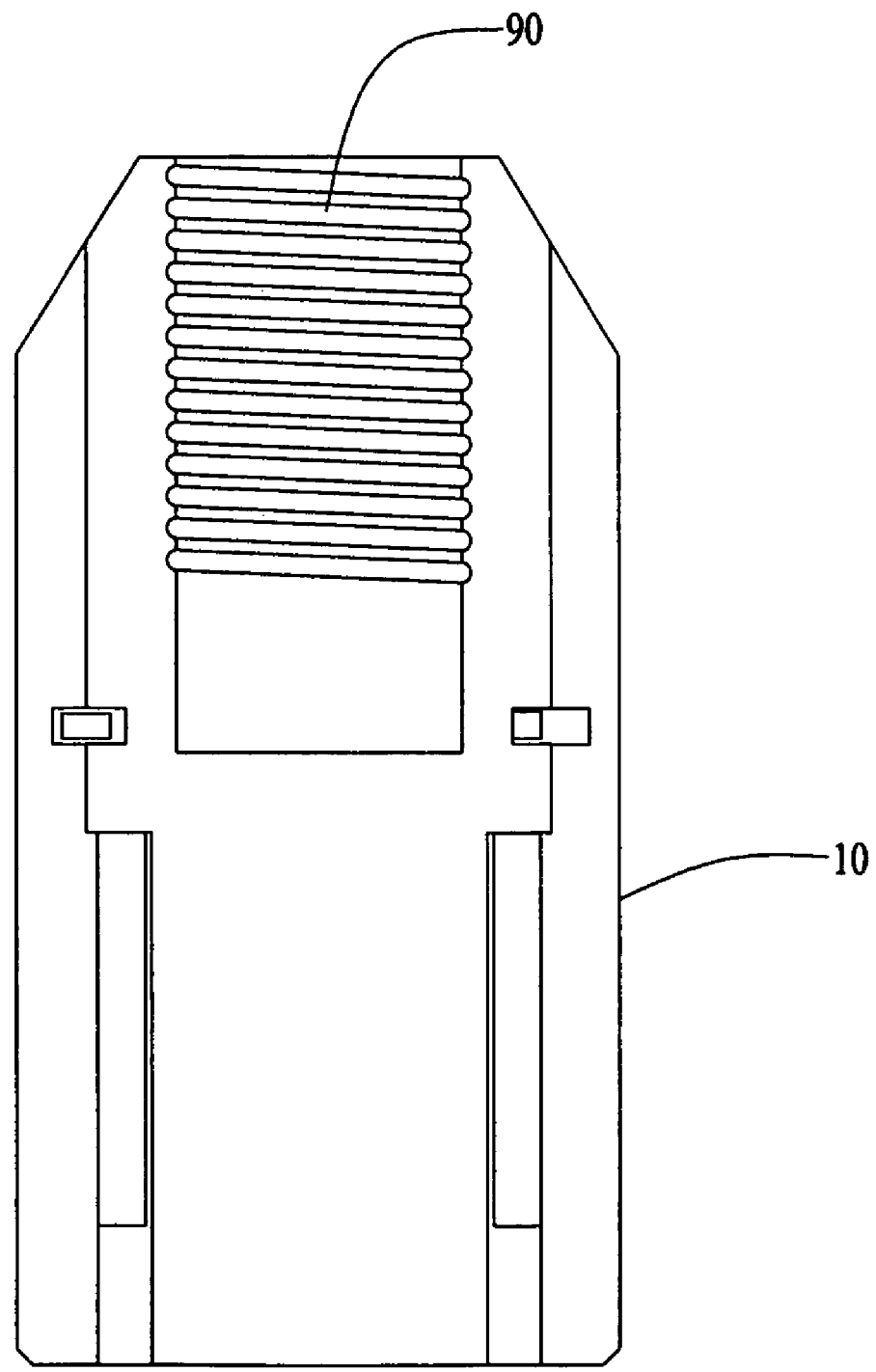
FIG. 11 illustrates a cross-sectional view of a wheel lock with a bolt inserted in accordance with an embodiment of the present invention.

FIG. 11 illustrates a cross-sectional view of the wheel lock 10 with the bolt 90 inserted in accordance with an embodiment of the present invention. As illustrated in FIG. 11, the bolt 90 has been received into the threaded opening 22 (refer to FIG. 4) of the key engaging member 20.

Figure 12:
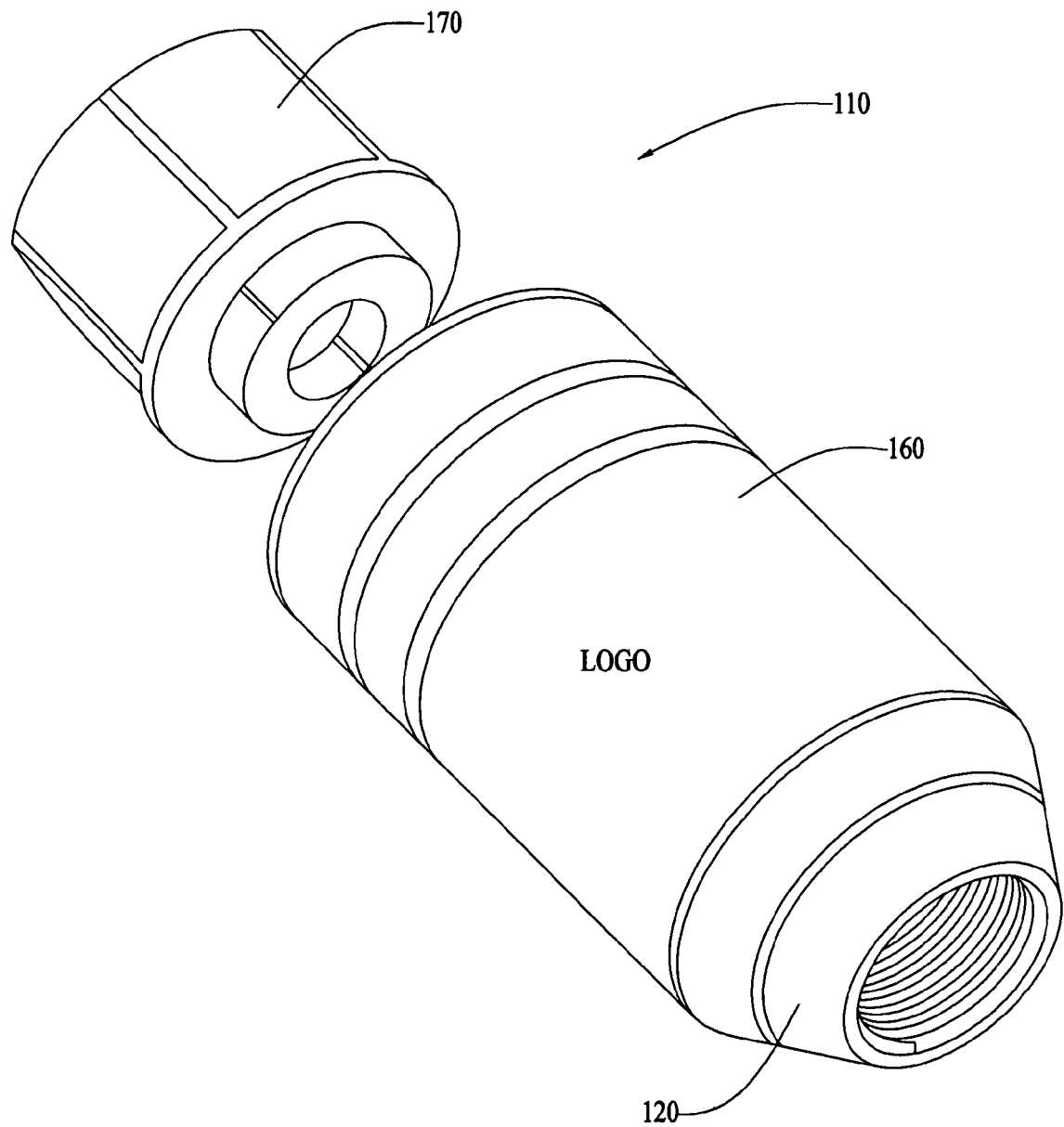
FIG. 12 illustrates a wheel lock in accordance with another embodiment of the present invention.

FIG. 12 illustrates a wheel lock 110 in accordance with another embodiment of the present invention. The wheel lock 110 comprises a key engaging member 120, a rotatable sleeve 160, and a key 170. The wheel lock 110 is similar to the wheel lock 10. The rotatable sleeve 160 of the wheel lock 110 comprises a smooth outer surface on which logos, text, pictures, or the like may be printed or placed.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A wheel lock, comprising:
  a key engaging member having a unitary, integral body provided with a threaded opening on one side of the unitary, integral body for receiving a bolt and a key shaped end on a second side of the unitary, integral body for mating with a key;
  a rotatable sleeve surrounding at least a portion of the key engaging member, the rotatable sleeve attached to the key engaging member and capable of rotating around a longitudinal axis of the key engaging member; and
  a spacer sleeve located between the key engaging member and the rotatable sleeve and supported to allow the spacer sleeve and the key engaging member to rotate relative to each other while the spacer sleeve remains in a fixed location in a direction of the longitudinal axis of the key engaging member;
  the key shaped end of the key engaging member being exposed for selective engagement and disengagement with the key, while the rotatable sleeve surrounds said at least a portion of the key engaging member;
  wherein the rotatable sleeve has an open end and wherein the key shaped end of the key engaging member is exposed through the open end of the rotatable sleeve, when the rotatable sleeve surrounds said at least a portion of the key engaging member.

2. The wheel lock of claim 1, further comprising:
  a spring washer for attaching the rotatable sleeve to the key engaging member.

3. The wheel lock of claim 2,
  wherein an outer surface of the key engaging member has an annular groove;
  wherein an inner surface of the rotatable sleeve has a particular annular groove; and
  wherein a first portion of the spring washer is located in the annular groove in the outer surface of the key engaging member and a second portion of the spring washer is located in the particular annular groove in the inner surface of the rotatable sleeve.

4. The wheel lock of claim 2,
  wherein the spring washer is capable of being compressed; and
  wherein the spring washer is capable of fitting entirely within the annular groove in the outer surface of the key engaging member when the spring washer is compressed.

5. The wheel lock of claim 1, further comprising:
  the key;
  wherein the key comprises:
    a shaped protrusion for mating with the key shaped end of the key engaging member; and
    one or more flat surfaces for receiving a socket to rotate the key.

6. The wheel lock of claim 5,
  wherein the key engaging member is configured such that the key engaging member rotates when the shaped protrusion of the key is mated with the key shaped end of the key engaging member and the key is rotated.

7. The wheel lock of claim 1,
  wherein a portion of the rotatable sleeve surrounds at least a portion of the key shaped end of the key engaging member.

8. The wheel lock of claim 1, wherein the rotatable sleeve is capable of rotating around the key engaging member without causing the threaded opening of the key engaging member to rotate.

9. The wheel lock of claim 1, wherein the rotatable sleeve is cylindrical with an opening from a first end of the rotatable sleeve to a second end of the rotatable sleeve.

10. The wheel lock of claim 1, wherein the threaded opening is at an opposite end of the key engaging member from the key shaped end.

11. A wheel lock, comprising:

a key engaging member having a unitary, integral body provided with a threaded opening on one side of the unitary, integral body for receiving a bolt and a key shaped end on a second side of the unitary, integral body for mating with a key;

a rotatable sleeve surrounding at least a portion of the key engaging member, the rotatable sleeve attached to the key engaging member and capable of rotating around a longitudinal axis of the key engaging member; and a spacer sleeve located between the key engaging member and the rotatable sleeve and supported to allow the spacer sleeve and the key engaging member to rotate relative to each other while the spacer sleeve remains in a fixed location in a direction of the longitudinal axis of the key engaging member;

the key shaped end of the key engaging member being exposed for selective engagement and disengagement with the key, while the rotatable sleeve surrounds said at least a portion of the key engaging member;

wherein the rotatable sleeve comprises a generally hollow tubular structure having an open end and wherein the key shaped end of the key engaging member is located within the hollow tubular structure, but accessible by the key through the open end of the rotatable sleeve, when the rotatable sleeve surrounds said at least a portion of the key engaging member.

* * * * *